(12) United States Patent  
Grandin et al.

(10) Patent No.: US 8,786,769 B2  
(45) Date of Patent: Jul. 22, 2014

(54) CAMERA MODULE HAVING PROTRUDING LENS BARREL

(75) Inventors: Thomas Guillaume Grandin, Kitchener (CA); Yun Seok Choi, Waterloo (CA); Soren Laustsen, Cambridge (CA)

(73) Assignee: Blackberry Limited, Waterloo, Ontario (CA)

( * ) Notice: Subject to any disclaimer, the term of this patent is extended or adjusted under 35 U.S.C. 154(b) by 29 days.

(21) Appl. No.: 13/550,643

(22) Filed: Jul. 17, 2012

(65) Prior Publication Data

US 2013/0155311 A1    Jun. 20, 2013

Related U.S. Application Data

(60) Provisional application No. 61/570,896, filed on Dec. 15, 2011.

(51) Int. Cl.
*H04N 5/225*    (2006.01)

(52) U.S. Cl.
USPC .......................................... 348/373; 348/335

(58) Field of Classification Search
USPC .......................................... 348/345, 373–375
See application file for complete search history.

(56) References Cited

U.S. PATENT DOCUMENTS

| 6,640,053 | B1* | 10/2003 | Dirisio ............................. 348/81 |
|---|---|---|---|
| 7,688,531 | B1 | 3/2010 | Deng et al. |
| 7,738,195 | B2 | 6/2010 | Mashima et al. |
| 7,787,198 | B1 | 8/2010 | Xu et al. |
| 7,911,719 | B2 | 3/2011 | Sakamoto |
| 7,955,007 | B2 | 6/2011 | Uehara |
| 8,000,030 | B2 | 8/2011 | Tang |
| 2003/0199995 | A1* | 10/2003 | Ishii et al. .......................... 700/9 |
| 2005/0201745 | A1* | 9/2005 | Nishizawa .................... 396/448 |
| 2006/0018039 | A1* | 1/2006 | Nuno ............................. 359/704 |
| 2009/0109319 | A1 | 4/2009 | Takatsuka et al. |
| 2010/0111516 | A1 | 5/2010 | Basho |
| 2010/0220404 | A1* | 9/2010 | Ugawa et al. ................. 359/824 |
| 2011/0128434 | A1* | 6/2011 | Hata et al. .................... 348/349 |
| 2011/0286737 | A1* | 11/2011 | Kim et al. .................... 396/533 |

OTHER PUBLICATIONS

CIPO, CA Office Action relating to Application No. 2,783,099 dated Jan. 29, 2014.

* cited by examiner

*Primary Examiner* — Gevell Selby  
(74) *Attorney, Agent, or Firm* — Rowand LLP

(57) ABSTRACT

An electronic device and camera module are described. The camera module includes a housing for housing components of the camera module. The housing has a top side which defines an opening. The camera module also includes a lens barrel housed by the housing and having one or more lens elements and an actuator housed by the housing and engaging the lens barrel. The actuator is configured to move the lens barrel to a first position in which at least a portion of the lens barrel extends through the opening. The camera module also includes an image sensor for receiving light which passes through the lens elements of the lens barrel. The image sensor is configured to produce an electronic signal based on the received light. The electronic device also includes a processor electrically connected to the camera module for receiving the electronic signal from the image sensor.

18 Claims, 6 Drawing Sheets

US 8,786,769 B2

CAMERA MODULE HAVING PROTRUDING LENS BARREL

CROSS-REFERENCE TO RELATED APPLICATIONS

The present application claims priority to U.S. provisional patent application Ser. No. 61/570,896, owned in common herewith and the contents of which are hereby incorporated by reference.

TECHNICAL FIELD

The present disclosure relates to camera modules and, more particularly, to a digital camera module having one or more movable lenses for focusing the camera.

BACKGROUND

Electronic devices such as smartphones and tablet computers are often equipped with one or more cameras. For example, electronic devices are often equipped with a front facing camera. A front facing camera is a camera which is oriented to capture an image of a subject located near a side of the electronic device which includes the main display of the electronic device. Front facing cameras allow a user of the electronic device to capture an image of the user and to view the display while the image is being captured.

Electronic devices are often also equipped with a rear facing camera. A rear facing camera is a camera which is oriented to capture an image of a subject located near a side of the electronic device which does not include the main display of the electronic device.

Front facing cameras and rear facing cameras are often provided, at least in part, by one or more camera modules. The camera modules often include an image sensor and one or more lenses. The lenses may be movable relative to the image sensor to focus on a subject.

The height of an electronic device is often related to the height of the camera module provided in the electronic device and the height of the camera module often depends on the focusing capabilities of the camera module. That is, when focusing on subjects which are located in close proximity to the electronic device, lenses of the camera module are typically moved to a position in which they are fully extended (i.e. they are far away from the image sensor). The height of the camera module is often dependent on the distance between the image sensor and the uppermost lens (i.e. the lens which is further away from the image sensor) when the lenses are fully extended.

BRIEF DESCRIPTION OF THE DRAWINGS

Reference will now be made, by way of example, to the accompanying drawings which show an embodiment of the present application, and in which.

Like reference numerals are used in the drawings to denote like elements and features.

DETAILED DESCRIPTION OF EXAMPLE EMBODIMENTS

In one aspect, the present disclosure describes a camera module. The camera module includes a housing for housing components of the camera module. The housing has a top side which defines an opening. The camera module also includes a lens barrel housed by the housing and having one or more lens elements and an actuator housed by the housing and engaging the lens barrel. The actuator is configured to move the lens barrel to a first position in which at least a portion of the lens barrel extends through the opening. The camera module also includes an image sensor for receiving light which passes through the lens elements of the lens barrel. The image sensor is configured to produce an electronic signal based on the received light.

In another aspect, the present disclosure describes an electronic device. The electronic device includes a camera module. The camera module includes a housing for housing components of the camera module. The housing has a top side which defines an opening. The camera module also includes a lens barrel housed by the housing and having one or more lens elements and an actuator housed by the housing and engaging the lens barrel. The actuator is configured to move the lens barrel to a first position in which at least a portion of the lens barrel extends through the opening. The camera module also includes an image sensor for receiving light which passes through the lens elements of the lens barrel. The image sensor is configured to produce an electronic signal based on the received light. The electronic device also includes a processor electrically connected to the camera module for receiving the electronic signal from the image sensor.

Other example embodiments of the present disclosure will be apparent to those of ordinary skill in the art from a review of the following detailed description in conjunction with the drawings.

Example Electronic Device

Figure 1:
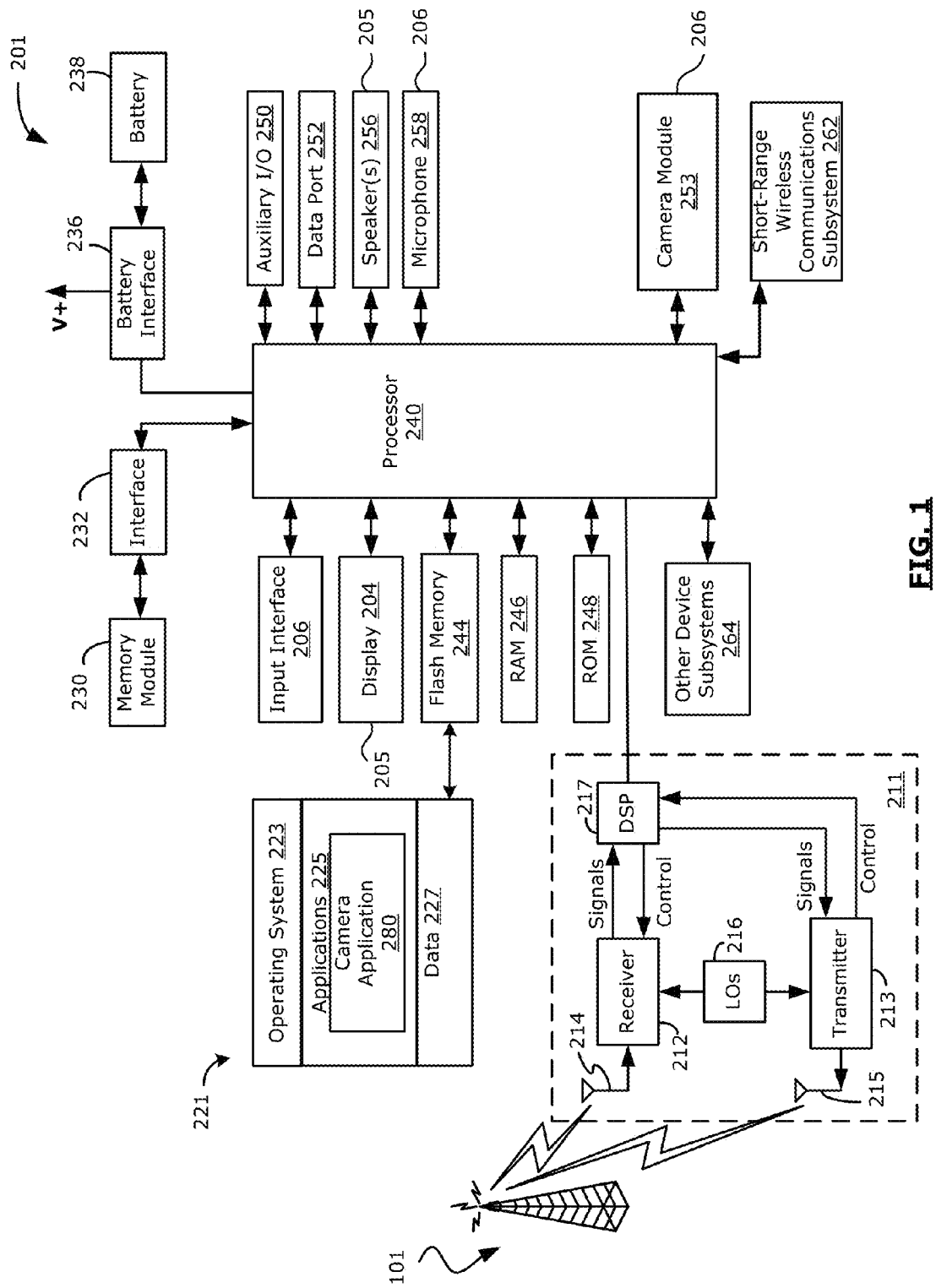
FIG. 1 is a block diagram illustrating an electronic device in accordance with example embodiments of the present disclosure.

Reference will now be made to FIG. 1 which illustrates an example electronic device 201 in which example embodiments described in the present disclosure can be applied. In the example embodiment illustrated, the electronic device 201 is a mobile communication device. That is, the electronic device 201 is configured to communicate with other electronic devices, servers and/or systems (i.e. it is a "communication" device) and the electronic device 201 is portable and may be easily moved between different physical locations (i.e. it is a "mobile" device). However, in other example embodiments, the electronic device 201 may not be portable (i.e. may not be a "mobile" device) and/or may not be configured to communicate with other systems (i.e. may not be a "communication" device).

Depending on the functionality provided by the electronic device 201, in various example embodiments the electronic device 201 may be a multiple-mode communication device configured for both data and voice communication, a mobile telephone such as a smartphone, a wearable computer such as a watch, a tablet computer such as a slate computer, a personal digital assistant (PDA), or a computer system. The electronic device 201 may take other forms apart from those specifically listed above. The electronic device 201 may also, in various embodiments, be referred to as a mobile communications device, a communication device, a mobile device, an electronic device and, in some cases, as a device.

The electronic device 201 includes a controller including one or more processor 240 (such as a microprocessor) which controls the overall operation of the electronic device 201. The processor 240 interacts with device subsystems such as a wireless communication subsystem 211 for exchanging radio frequency signals with a wireless network 101 to perform communication functions. The processor 240 may be communicably coupled with additional device subsystems including one or more output interfaces 205 (such as a display 204 and/or a speaker 256), one or more input interfaces 206 (such as a camera module 253, microphone 258, keyboard (not shown), control buttons (not shown), a touch-sensitive overlay (not shown) associated with a touchscreen display 204 and/or other input interfaces 206), memory (such as flash memory 244, random access memory (RAM) 246, read only memory (ROM) 248, etc.), auxiliary input/output (I/O) subsystems 250, a data port 252 (which may be a serial data port, such as a Universal Serial Bus (USB) data port), a short-range communication subsystem 262 and other device subsystems generally designated as 264. Some of the subsystems shown in FIG. 1 perform communication-related functions, whereas other subsystems may provide "resident" or on-device functions.

In at least some example embodiments, the electronic device 201 may include a touchscreen display which acts as both an input interface 206 (i.e. touch-sensitive overlay) and an output interface 205 (i.e. display). The touchscreen display may be constructed using a touch-sensitive input surface which is connected to an electronic controller and which overlays the display 204. The touch-sensitive overlay and the electronic controller provide a touch-sensitive input interface 206 and the processor 240 interacts with the touch-sensitive overlay via the electronic controller.

The electronic device 201 may include a communication subsystem 211 which allows the electronic device 201 to communicate over a wireless network 101. The communication subsystem 211 includes a receiver 212, a transmitter 213, and associated components, such as one or more antenna elements 214 and 215, local oscillators (LOs) 216, and a processing module such as a digital signal processor (DSP) 217. The antenna elements 214 and 215 may be embedded or internal to the electronic device 201 and a single antenna may be shared by both receiver and transmitter. The particular design of the wireless communication subsystem 211 depends on the wireless network 101 in which electronic device 201 is intended to operate.

In at least some example embodiments, the electronic device 201 may communicate with any one of a plurality of fixed transceiver base stations of the wireless network 101 within its geographic coverage area. The electronic device 201 may send and receive communication signals over the wireless network 101 after the required network registration or activation procedures have been completed. Signals received by the antenna 214 through the wireless network 101 are input to the receiver 212, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 217. In a similar manner, signals to be transmitted are processed, including modulation and encoding, for example, by the DSP 217. These DSP-processed signals are input to the transmitter 213 for digital-to-analog (D/A) conversion, frequency up conversion, filtering, amplification, and transmission to the wireless network 101 via the antenna 215. The DSP 217 not only processes communication signals, but may also provide for receiver and transmitter control. For example, the gains applied to communication signals in the receiver 212 and the transmitter 213 may be adaptively controlled through automatic gain control algorithms implemented in the DSP 217.

In some example embodiments, the auxiliary input/output (I/O) subsystems 250 may include an external communication link or interface; for example, an Ethernet connection. The electronic device 201 may include other wireless communication interfaces for communicating with other types of wireless networks; for example, a wireless network such as an orthogonal frequency division multiplexed (OFDM) network. The auxiliary I/O subsystems 250 may include a vibrator for providing vibratory notifications in response to various events on the electronic device 201 such as receipt of an electronic communication or incoming phone call, or for other purposes such as haptic feedback (touch feedback).

In some example embodiments, the electronic device 201 also includes a removable memory module 230 (which may be flash memory, such as a removable memory card) and a memory interface 232. Network access may be associated with a subscriber or user of the electronic device 201 via the memory module 230, which may be a Subscriber Identity Module (SIM) card for use in a GSM network or other type of memory card for use in the relevant wireless network type. The memory module 230 is inserted in or connected to the memory interface 232 of the electronic device 201 in order to operate in conjunction with the wireless network 101.

The data port 252 may be used for synchronization with a user's host computer system (not shown). The data port 252 enables a user to set preferences through an external device or software application and extends the capabilities of the electronic device 201 by providing for information or software downloads to the electronic device 201 other than through the wireless network 101. The alternate download path may for example, be used to load an encryption key onto the electronic device 201 through a direct, reliable and trusted connection to thereby provide secure device communication.

The electronic device 201 includes one or more camera modules 253. The camera module 253 is capable of capturing camera data such as images in the form of still photographs and/or motion video. The camera data may be captured in the form of an electronic signal which is produced by an image sensor. The camera module 253 will be described in greater detail below with reference to FIGS. 4 to 10. The camera module 253 may be associated with a front facing camera or a rear facing camera.

A front facing camera is provided by a camera module 253 which is located to obtain images of a subject near a front face of the electronic device 201. The front face is typically the face on which a main display 204 is mounted. That is, when a front facing camera is provided on the electronic device 201, the display 204 is configured to display content which may be viewed from a side of the electronic device 201 where the camera module 253 is directed.

The camera module 253 of the front facing camera may be located above or below the display 204. In at least some example embodiments, the camera module 253 may be provided in a central location relative to the display 204 to facilitate image acquisition of a face. For example, the camera module 253 may be located centrally above the display 204.

A rear facing camera is provided by a camera module 253 which is located to obtain images of a subject near a rear face of the electronic device 201. The rear face is typically a face which does not include the main display 204 of the electronic device 201. In at least some embodiments, the electronic device 201 may operate in one operating mode in which the display 204 acts as a viewfinder displaying image data associated with a rear facing camera.

The rear facing camera may obtain images which are not within the field of view of the front facing camera. The field of view of the front facing and rear facing cameras may generally be in opposing directions.

While FIG. 1 illustrates a single camera module 253, the electronic device 201 may include a plurality of camera modules 253. For example, in at least some embodiments, the electronic device 201 may include both a front facing camera (which includes a first camera module 253) and a rear facing camera (which includes a second camera module 253).

In some example embodiments, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to a host computer system using standard connectivity protocols. When a user connects their electronic device 201 to the host computer system via a USB cable or Bluetooth® connection, traffic that was destined for the wireless network 101 is automatically routed to the electronic device 201 using the USB cable or Bluetooth® connection. Similarly, any traffic destined for the wireless network 101 is automatically sent over the USB cable or Bluetooth® connection to the host computer system for processing.

The electronic device 201 also includes or is connected to a power source, such as a battery 238, which is typically one or more rechargeable batteries that may be charged for example, through charging circuitry coupled to a battery interface 236 such as the data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The electronic device 201 stores data 227 in an erasable persistent memory, which in one example embodiment is the flash memory 244. In various example embodiments, the data 227 includes service data including information used by the electronic device 201 to establish and maintain communication with the wireless network 101. The data 227 may also include user application data such as email messages, address book and contact information, camera data, calendar and schedule information, notepad documents, image files, and other commonly stored user information stored on the electronic device 201 by its user, and other data. The data 227 stored in the persistent memory (e.g. flash memory 244) of the electronic device 201 may be organized, at least partially, into one or more databases or data stores. The databases or data stores may contain data items of the same data type or associated with the same application. For example, email messages, contact records, and task items may be stored in individual databases within the device memory.

The electronic device 201 may, in some example embodiments, be a mobile communication device which may provide two principal modes of communication: a data communication mode and a voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by an email messaging application and output to the display 204. A user of the electronic device 201 may also compose data items, such as email messages; for example, using the input devices in conjunction with the display 204. These composed items may be transmitted through the communication subsystem 211 over the wireless network 101.

In the voice communication mode, the electronic device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input interfaces 206). Alternative voice or audio I/O subsystems, such as a voice message recording subsystem, may also be implemented on the electronic device 201. Although voice or audio signal output is typically accomplished primarily through the speaker 256, the display 204 may also be used to provide an indication of the identity of a calling party, duration of a voice call, or other voice call related information.

The processor 240 operates under stored program control and executes software modules 221 stored in memory such as persistent memory; for example, in the flash memory 244. As illustrated in FIG. 1, the software modules 221 include operating system software 223 and other software applications 225.

The processor 240 may be electrically connected to the camera module 253 to allow the processor 240 to receive electronic signals representing camera data from the camera module 253.

In at least some embodiments, the software modules 221 may include one or more camera applications 280 or modules which are configured for handing the electronic signals representing camera data from the camera module 253. The camera application 280 may, for example, be configured to provide a viewfinder on the display 204 by displaying, in real time or near real time, an image defined in the electronic signals received from the camera module 253. The camera application 280 may also be configured to capture an image or video by storing an image or video defined by the electronic signals received from the camera module 253. For example, the camera application 280 may be configured to store the image or video to memory of the electronic device.

The camera application 280 may also be configured to control options or preferences associated with the camera module 253. For example, the camera application 280 may be configured to control a camera lens aperture and/or a shutter speed. The control of such features may, in at least some embodiments, be automatically performed by the camera software based on output received from a light exposure meter.

In at least some embodiments, the camera application 280 may be configured to control a flash associated with the camera module 253 and/or to control a zoom associated with the camera module 253. In at least some embodiments, the camera application 280 is to provide digital zoom features. The camera application 280 may provide digital zoom features by cropping an image down to a centered area with the same aspect ratio as the original. In at least some embodiments, the camera application 280 may interpolate within the cropped image to bring the cropped image back up to the pixel dimensions of the original. The camera application 280 may, in at least some embodiments, provide image stabilization for the camera. Image stabilization may reduce blurring associated with movement of the camera module 253.

In at least some embodiments, the camera application 280 may be configured to focus the camera module 253 on a subject. More particularly, the camera application 280 may be configured to control an actuator 410 (FIG. 7) of the camera module 253 to move a lens (which is comprised of one or more lens elements) in the camera module 253 relative to an image sensor in the camera module 253. For example, when capturing images of subjects which are very close to the camera module 253 (e.g. subject at macro position), the camera application 280 may control the actuator to cause the actuator to move the lens away from the image sensor.

In at least some embodiments, the camera application 280 may provide for auto-focusing capabilities. For example, the camera application 280 may analyze received electronic signals to determine whether the images captured by the camera are in focus. That is, the camera application 280 may determine whether the images defined by electronic signals received from the camera module 253 are focused properly on the subject of such images. The camera application 280 may, for example, make this determination based on the sharpness of such images. If the camera application 280 determines that the images are not in focus, then the camera application 280 may cause the processor to adjust the actuator which controls the lens to focus the image.

While the embodiment discussed above includes a main processor 240 coupled with a camera application 280 which collectively act as an image signal processor to provide image related functions such as auto-focusing, in other embodiments (not shown), another processor such as a dedicated image signal processor, may provide some or all of these functions.

In the example embodiment of FIG. 1, camera application 280 is illustrated as a stand-alone application 225. However, in other example embodiments, the camera application 280 may be implemented as part of the operating system 223 or another application 225. Furthermore, in some embodiments, the functions of the camera application 280 may be provided by a plurality of applications.

The software applications 225 on the electronic device 201 may also include a range of additional applications including, for example, a notepad application, Internet browser application, voice communication (i.e. telephony) application, mapping application, or a media player application, or any combination thereof. Each of the software applications 225 may include layout information defining the placement of particular fields and graphic elements (e.g. text fields, input fields, icons, etc.) in the user interface (e.g. the display 204) according to the application.

The software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

A predetermined set of applications that control basic device operations, including data and possibly voice communication applications will normally be installed on the electronic device 201 during or after manufacture. Additional applications and/or upgrades to the operating system 223 or software applications 225 may also be loaded onto the electronic device 201 through the wireless network 101, the auxiliary I/O subsystem 250, the data port 252, the short-range communication subsystem 262, or other suitable subsystem 264. The downloaded programs or code modules may be permanently installed; for example, written into the program memory (i.e. the flash memory 244), or written into and executed from the RAM 246 for execution by the processor 240 at runtime.

Example Smartphone Electronic Device

As discussed above, the electronic device 201 may take a variety of forms. For example, in at least some example embodiments, the electronic device may be a smartphone.

Figures 2, 3:
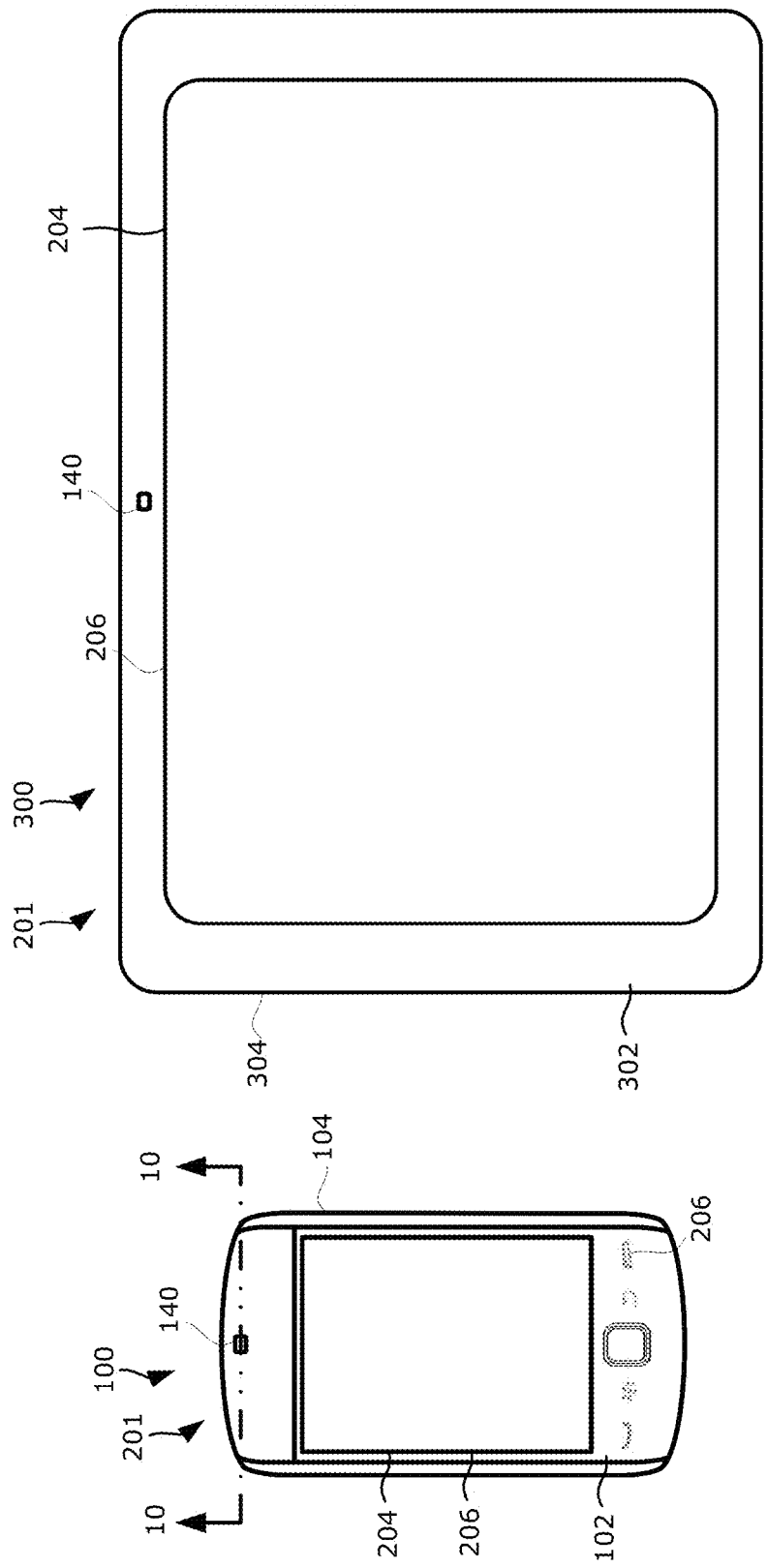
FIG. 2 is a front view of a smartphone in accordance with example embodiments of the present disclosure.
FIG. 3 is a front view of a tablet computer is accordance with example embodiments of the present disclosure.

Referring now to FIG. 2, a front view of an example electronic device 201 which is a smartphone 100 is illustrated. The smartphone 100 is a mobile phone which offers more advanced computing capability than a basic non-smartphone cellular phone. For example, the smartphone 100 may have the ability to run third party applications which are stored on the smartphone.

The smartphone 100 may include the components discussed above with reference to FIG. 1 or a subset of those components. The smartphone 100 includes a housing 104 which houses at least some of the components discussed above with reference to FIG. 1.

In the example embodiment illustrated, the smartphone includes a display 204, which may be a touchscreen display which acts as an input interface 206. The display 204 is disposed within the smartphone 100 so that it is viewable at a front side 102 of the smartphone 100. That is, a viewable side of the display 204 is disposed on the front side 102 of the smartphone. In the example embodiment illustrated, the display 204 is framed by the housing 104.

The example smartphone 100 also includes other input interfaces 206 such as one or more buttons, keys or navigational input mechanisms. In the example illustrated, at least some of these additional input interfaces 206 are disposed for actuation at a front side 102 of the smartphone.

The example smartphone 100 also includes a front facing camera 140 which may include a camera module 253 (as illustrated in FIGS. 4 to 10). The front facing camera 140 may be located vertically above the display 204 when the smartphone 100 is held in a portrait orientation where its height is longer than its width. The front facing camera 140 is located so that it may capture images of objects which are located in front of and/or surrounding the front side of the smartphone 100.

In at least some embodiments (not shown), the smartphone 100 may also include a rear facing camera instead of or in addition to the front facing camera. The rear facing camera may be located on the back face of the smartphone 100. That is, the rear facing camera may be located on a side of the smartphone which does not include the main display 204. The rear facing camera may include a camera module 253, such as the camera module 253 of FIGS. 4 to 10.

Example Tablet Electronic Device

In at least some example embodiments, the electronic device 201 may be a tablet computer. Referring now to FIG.

3, a front view of an example electronic device 201 which is a tablet computer 300 is illustrated.

The tablet computer 300 of FIG. 3 may include many of the same features and components of the smartphone 100 of FIG. 2. However, the tablet computer 300 of FIG. 3 is generally larger than the smartphone 100 of FIG. 2. The tablet computer 300 may include the components discussed above with reference to FIG. 1 or a subset of those components. The tablet computer 300 includes a housing 304 which houses at least some of the components discussed above with reference to FIG. 1.

The tablet computer 300 includes a display 204, which may be a touchscreen display which acts as an input interface 206. The display 204 is disposed within the tablet computer 300 so that it is viewable at a front side 302 of the tablet computer 300. That is, a viewable side of the display 204 is disposed on the front side 302 of the tablet computer 300. In the example embodiment illustrated, the display 204 is framed by the housing 304.

The example tablet computer 300 includes a front facing camera 140 which may be located vertically above the display 204 when the tablet computer 300 is held in a landscape orientation (i.e. the orientation of FIG. 3). The front facing camera 140 is located so that it may capture images of objects which are located in front of and/or surrounding the front side of the tablet computer 300. The front facing camera 140 may include a camera module 253 (as illustrated in FIGS. 4 to 10).

In at least some embodiments (not shown), the tablet computer 300 may also include a rear facing camera instead of or in addition to the front facing camera. The rear facing camera may be located on the back face of the tablet computer 300. That is, the rear facing camera may be located on a side of the tablet computer 300 which does not include the main display 204. The rear facing camera may include a camera module 253, such as the camera module 253 of FIGS. 4 to 10.

Camera Module

Reference will now be made to FIGS. 4 to 10 which illustrate example embodiments of a camera module 253. The camera module 253 may be included in the electronic device 201 of FIGS. 1 to 3.

Figure 4:
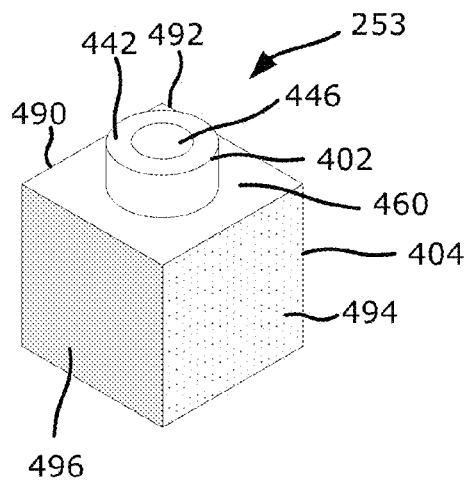
FIG. 4 is an isometric view of a camera module in accordance with example embodiments of the present disclosure.
Figure 5:
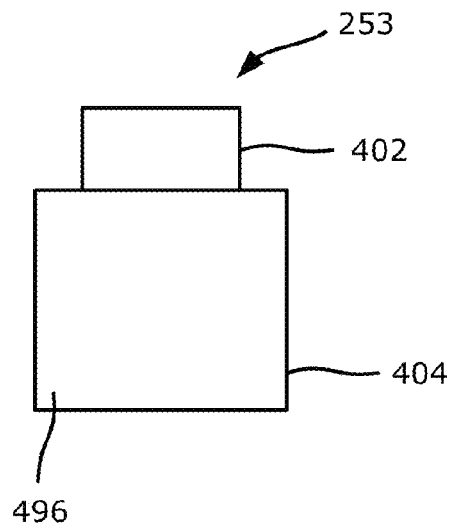
FIG. 5 is a front elevation view of the camera module of FIG. 4.
Figure 6:
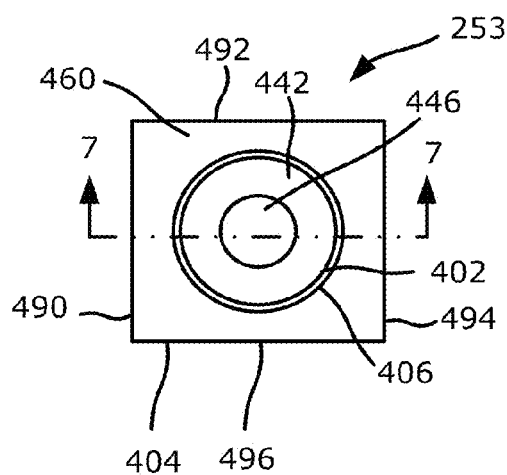
FIG. 6 is a top view of the camera module of FIGS. 4 and 5.
Figure 7:
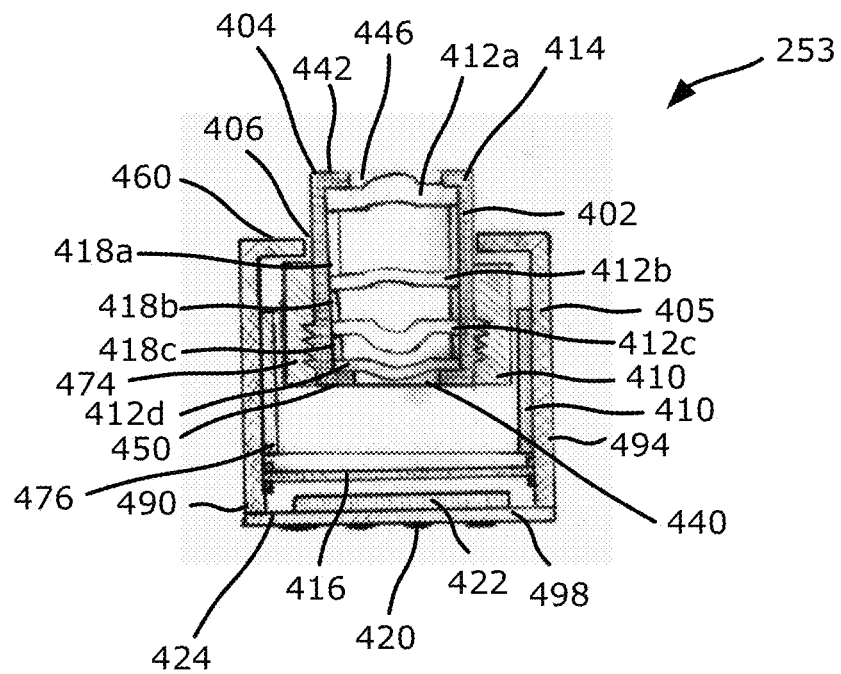
FIG. 7 is a cross sectional view of the camera module of FIGS. 4 to 6 taken along line 7-7 of FIG. 6 illustrating the camera module in a first position.
Figure 8:
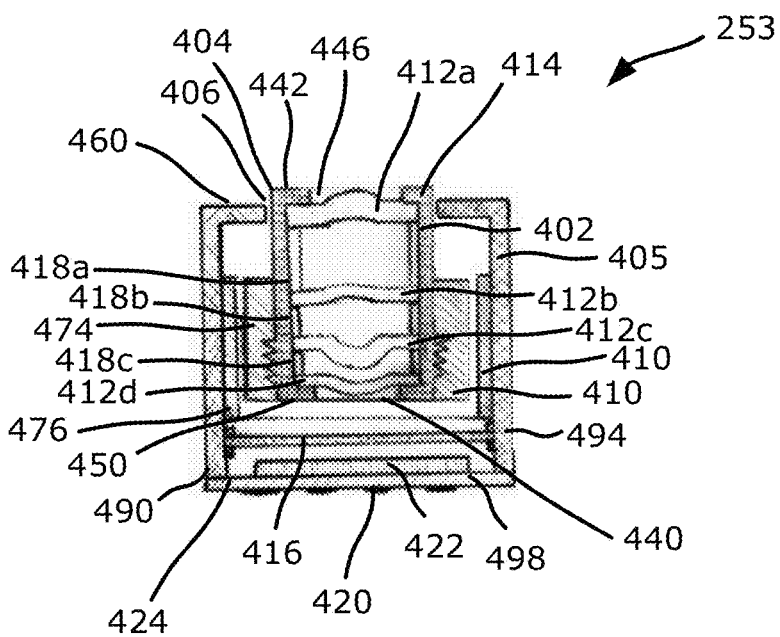
FIG. 8 is a cross sectional view of the camera module of FIGS. 4 to 6 taken along line 7-7 of FIG. 6 illustrating a lens of the camera module in a second position.
Figure 9:
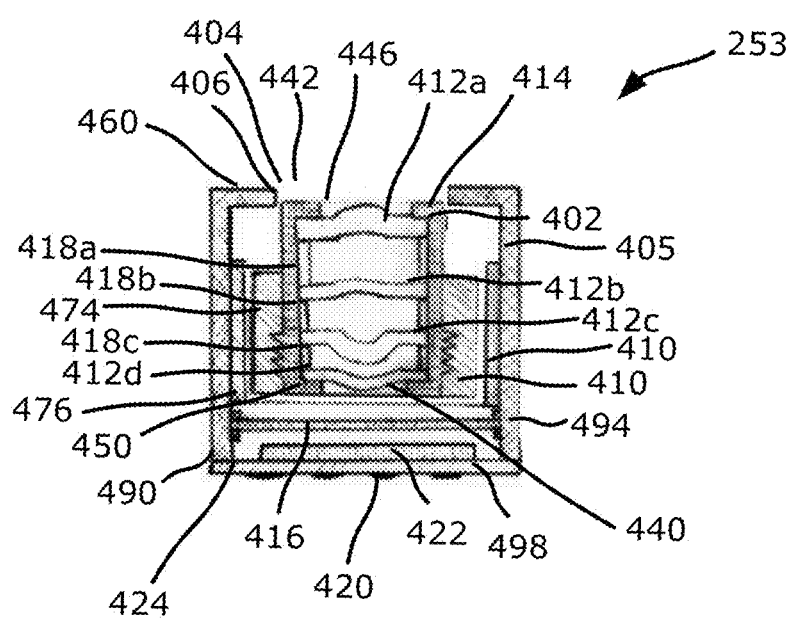
FIG. 9 is a cross sectional view of the camera module of FIGS. 4 to 6 taken along line 7-7 of FIG. 6 illustrating a lens of the camera module in a further second position.

Referring first to FIGS. 4 to 10, the camera module 253 is illustrated in lens-extended orientation in which a lens (which includes one or more lens elements) of the camera module is moved away from an image sensor. More particularly, FIG. 4 illustrates an isometric view of the camera module 253 in the lens-extended orientation, FIG. 5 illustrates a side view of the camera module 253 in the lens-extended orientation, FIG. 6 illustrates a top view of the camera module 253 in the lens-extended orientation and FIG. 7 illustrates a cross sectional view of the camera module 253 in the lens-extended orientation. The cross sectional view is taken along line 7-7 of FIG. 6. FIG. 8 illustrates a cross sectional view of the camera module 253 where the lens (which includes one or more lens elements) is extended by a lesser amount than in FIG. 7. FIG. 9 illustrates a cross sectional view of the camera module 253 where the lens (which includes one or more lens elements) does not protrude from the camera module.

As illustrated in FIG. 7, the camera module includes an image pickup device which may, in at least some example embodiments, be referred to as an image sensor 422. The image sensor 422 is configured to produce an electronic signal in dependence on received light. More particularly, the image sensor 422 converts an optical image into an electronic signal, which may be output from the image sensor 422 by way of one or more electrical connectors associated with the image sensor 422. The electronic signal represents electronic image data (which may also be referred to as camera data).

In at least some embodiments, the image sensor 422 is a charge-coupled device (CCD) image sensor. In other embodiments, the image sensor 422 is a complementary metal-oxide-semiconductor (CMOS) image sensor. In some embodiments, the image sensor may be of another type. For example, in some embodiments, the image sensor 422 may be a hybrid CCD/CMOS image sensor 422, such as a scientific CMOS (sCMOS) image sensor 422. In the example embodiment illustrated, the image sensor 422 is rectangular in shape.

In at least some embodiments, the image sensor 422 is a surface mount image sensor which may be mounted on a substrate 424, such as a printed circuit board (PCB), which may be a flexible PCB. The electrical connectors of the image sensor 422 may be connected, through the substrate 424, to one or more processors 240 (FIG. 1) associated with an electronic device 201 (FIGS. 1 to 3) in order to provide the electrical signal which represents an optical image to the processor.

The camera module 253 may also include a lens, which includes one or more lens elements 412a, 412b, 412c, 412d which may be used to focus light onto the image sensor 422. The image sensor 422 is exposed to light passing through the one or more lens elements 412a, 412b, 412c, 412d. That is, the image sensor is located within the camera module 253 to receive light which has passed through the lens elements 412a, 412b, 412c, 412d of a lens barrel 402. In the embodiment illustrated, there are four lens elements 412a, 412b, 412c, 412d in a lens, including a first lens element 412a, which is the uppermost lens element and which is furthest away from the image sensor 422, a second lens element 412b which is adjacent to the first lens element 412a, a third lens element 412c which is adjacent to the second lens element 412b, and a fourth lens element 412d which is adjacent to the third lens element 412c and which is a lowermost lens element (i.e. is nearest to the image sensor 422).

While the camera module 253 of FIGS. 4 to 7 includes a lens which includes four lens elements 412a, 412b, 412c, 412d, in other embodiments, the lens may include a greater or lesser number of lens elements 412a, 412b, 412c, 412d.

The lens elements 412a, 412b, 412c, 412d may be disposed within the lens barrel 402. The lens barrel 402 may include a lens barrel housing 404 which houses at least some components of the lens barrel 402, such as the lens elements 412a, 412b, 412c, 412d. The lens barrel housing 404 may be cylindrical or substantially cylindrical. The lens barrel housing 404 may, for example, be constructed of a plastic material. The lens barrel 402 has a light-receiving end 442 and a light-providing end 440. At the light-receiving end 442, the lens barrel 402 defines an aperture 446 through which light from outside of the lens barrel 402 may enter and be received within the lens barrel 402. The aperture 446 may be defined by the lens barrel housing 404 of the lens barrel 402. The lens barrel 402 may be referred to as a focusing lens barrel 402 since the lens barrel is configured to move relative to the image sensor 422 in order to focus the camera module 253 on a subject.

The lens barrel 402 may, in at least some embodiments, include a plurality of lens elements 412a, 412b, 412c, 412d which are disposed between the light-receiving end 442 and the light-providing end 440 of the lens barrel 402. The lens elements 412a, 412b, 412c, 412d may have a circular perimeter to fit within a cylindrical or substantially cylindrical lens barrel housing 404. The lens elements 412a, 412b, 412c, 412d may be tightly packed within the lens barrel 402 and may form a lens.

The lens elements 412a, 412b, 412c, 412d may be mounted within the lens barrel housing 404 using one or more supports. The supports hold the lens elements 412a, 412b, 412c, 412d in place and prevent the lens elements 412a, 412b, 412c, 412d from moving relative to the lens barrel housing 404. That is, the lens elements 412a, 412b, 412c, 412d are supported by the supports so that movement of the lens barrel housing 404 results in corresponding movement of the lens elements 412a, 412b, 412c, 412d (and the lens formed by the lens elements 412a, 412b, 412c, 412d).

The supports may in some embodiments include one or more prongs. In the example embodiment illustrated, the lens elements 412a, 412b, 412c, 412d are supported within the lens barrel housing 404 by two supports, which include a seat 414 and a collar 450.

The collar 450 supports a lowermost lens element 412d. The collar 450 may, in some embodiments, be affixed to the lens barrel housing 404 and is used to prevent movement of the lens elements 412a, 412b, 412c, 412d relative to the lens barrel housing 404. In at least some embodiments, the collar 450 is a portion of the lens barrel housing 404 which protrudes into a cavity defined by the lens barrel housing 404 in order to support one or more of the lens elements 412a, 412b, 412c, 412d. In the embodiment illustrated, the collar 450 is an annular collar and is located at the light-providing end 440 of the lens barrel housing 404. In at least some embodiments, the collar 450 may be removable to allow a lens to be inserted into the lens barrel housing 404. That is, the collar 450 may be removed from the lens barrel housing 404 to permit lens elements 412a, 412b, 412c, 412d to be inserted into the lens barrel housing 404. For example, in at least some embodiments, the collar 450 may be attached to the lens barrel housing 404 by a threaded connection and may be removed by relative rotation of the collar 450 relative to the lens barrel housing 404.

In the example embodiment illustrated, the lens elements 412a, 412b, 412c, 412d are also supported by a seat 414 which supports an uppermost lens element 412a. That is, the seat 414 may restrain one or more of the lens elements 412a, 412b, 412c, 412d against movement in at least one direction. In the example embodiment illustrated, the seat 414 restrains the lens elements 412a, 412b, 412c, 412d against upward movement. In the example embodiment of FIGS. 4 to 7, the seat 414 is provided by the lens barrel housing 404 at the light-receiving end 442 of the lens barrel housing 404. The seat 414 and collar 450 hold the lens elements in place within the lens barrel. That is, the seat 414 and collar 450 prevent the lens elements 412a, 412b, 412c, 412d from moving relative to the lens barrel 402. More particularly, the lens elements 412a, 412b, 412c, 412d are inserted tightly between the seat 414 and the collar 450 in order to prevent movement of the lens elements 412a, 412b, 412c, 412d within the lens barrel 402. In the embodiment illustrated, the seat 414 is an annular seat.

The lens barrel 402 may also include one or more spacers 418a, 418b, 418c which separate the lens elements 412a, 412b, 412c, 412d and which hold the lens elements 412a, 412b, 412c, 412d in a fixed orientation and which prevent the lens elements 412a, 412b, 412c, 412d from contacting adjacent lens elements 412a, 412b, 412c, 412d. In at least some embodiments, a spacer 418a, 418b, 418c may be located between each pair of adjacent lens elements 412a, 412b, 412c, 412d. In at least some embodiments, the spacers 418a, 418b, 418c may be annular and may define an opening through which light may pass. The spacers 418a, 418b, 418c may, in at least some embodiments, be constructed of plastic. In some embodiments, the spacers 418a, 418b, 418c may be constructed of a material which is compressible, such as a rubber material, and the collar and seat may compress the spacers 418a, 418b, 418c.

In the embodiment illustrated in FIGS. 4 to 7, the lens barrel 402 includes three spacers 418a, 418b, 418c (a first spacer 418a, a second spacer 418b, and a third spacer 418c). In other embodiments, a greater or lesser number of spacers may be included. The number of spacers 418a, 418b, 418c may depend upon the number of lens elements 412a, 412b, 412c, 412d in the lens barrel 402. The lens barrel 402, the spacers 418a, 418b, 418c and the lens elements 412a, 412b, 412c, 412d may collectively form a lens.

In at least some embodiments, the camera module 253 includes an infrared (IR) cut-off filter, which may be referred to as an IR cut filter 416. An IR cut filter 416 is a filter which is designed to reflect or block mid-infrared wavelength light while passing visible light. That is, the IR cut filter 416 is configured to remove IR light.

The IR cut filter 416 is disposed within the camera module 253 between the lens elements 412a, 412b, 412c, 412d and the image sensor 422. That is, the IR cut filter 416 is disposed so that light which passes through the lens barrel 402 and which is emitted from the lens barrel 402 at the light-providing end 440 of the lens barrel 402 passes through the IR cut filter 416 before reaching the image sensor 422. In such embodiments, light which reaches the image sensor 422 is light which has passed through the IR cut filter 416. Accordingly, the IR cut filter 416 removes IR light so that only visible light is captured by the image sensor 422. The IR cut filter 416 may have a size and shape which corresponds to the size and shape of the image sensor 422. In the example illustrated, both the image sensor 422 and the IR cut filter 416 are rectangular in shape.

The camera module 253 includes a housing 405 which houses components of the camera module 253 such as the image sensor 422. In the example illustrated, the housing 405 is shaped as a rectangular prism having four sides (a first side 490 (FIG. 6), second side 492 (FIG. 6), third side 494 (FIG. 6) and a fourth side 496 (FIG. 6)).

The housing 405 may also include a bottom side 498 which may, in at least some embodiments, be a substrate 424, such as a PCB (such as a flexible PCB) or another electrical connector for connecting the camera module to other components of an electrical device. The bottom side 498 of the housing 405 is located near the image sensor 422.

The substrate 424 may connect to the image sensor 422. For example, the image sensor 422 may be connected to the substrate 424 on an interior side of the substrate 424. The substrate 424 may also have a connection interface 420 for electrically connecting the substrate 424 to other components of an electronic device 201 (FIGS. 1 to 3), such as a processor 240 (FIG. 1). That is, the substrate 424 electrically connects electrical components of the camera module 253, such as the image sensor 422 and/or an actuator 410, to one or more external electrical components. In at least some embodiments, the camera module 253 may be a surface mount camera module 253 which is configured to connect to a PCB via surface mounting techniques. In at least some embodiments, the substrate 242 includes a board to board (B2B) connector for connecting the camera module 253 to a mated connector provided on a PCB of an electronic device 201.

The housing 405 may also include a top side 460 which may be substantially parallel to the image sensor 422. The top side 460 may be the side of the housing 405 which is further away from the image sensor 422. In the embodiment illustrated, one or more lens elements are located between the top side 460 and the image sensor.

The top side 460 of the housing 405 is the side of the housing 405 which will generally be nearest the subject of an image captured by the image sensor 422. That is, the top side of the housing 405 is located on a light-receiving-end of the camera module 253.

The top side 460 of the housing 405 is, in at least some embodiments, constructed of plastic. In some embodiments, the top side 460 of the housing 405 may be constructed of an opaque, or near opaque material or may be coated with an opaque or near opaque material to hide internal components of the camera module 253 from external viewing. That is, the top side 460 of the housing 405 may act as a baffle for the camera module 253. The housing 405 may, in at least some embodiments, also provide electromagnetic interference (EMI) shielding to other components of the camera module 253 (such as the image sensor 422).

The top side 460 of the housing 405 defines an opening 406 through which at least a portion of the lens barrel 402 may protrude. As will be described in greater detail below, the camera module 253 may be equipped with an actuator 410 which moves the lens barrel 402 relative to the image sensor 422. That is, the actuator 410 moves the lens barrel 402 between two extreme positions (e.g., terminal positions) including, a first position (which is illustrated in FIGS. 4 to 7) and a second position (which may be the position illustrated in FIG. 8 or the position illustrated in FIG. 9). These extreme positions may also be referred to as terminal positions. The terminal positions are the end positions provided by the actuator 410. That is, the terminal positions are the positions which are at the end of the range of the actuator 410.

Accordingly, at least a portion of the lens barrel 402 is configured to pass through the opening 406.

The opening 406 may have a shape which corresponds to the shape of at least a portion of the lens barrel 402. For example, in the example embodiment illustrated, the opening 406 is circular and the portion of the lens barrel 402 which passes through the opening 406 has a circular perimeter (i.e. the portion of the lens barrel 402 which passes through the opening 406 may be cylindrical).

The opening 406 may have a size which corresponds to the size of the portion of the lens barrel 402 which passes through the opening 406. For example, the opening 406 may be slightly larger than the size of the lens barrel 402 which passes through the opening. In the embodiment illustrated, the lens barrel 402 has a circular perimeter along the portion of the lens barrel 402 which passes through the opening 406 and the opening 406 is a slightly larger circle.

As will be described in greater detail below, the portion of the top side 460 of the housing 405 which surrounds the opening 406 may be configured to receive a gasket on the external surface of the top side 460. A cover may be placed over the gasket to seal the camera module 253 from outside elements such as dust and debris. Since the top side 460 is configured to receive a gasket, the top side may be referred to as a gasket seat.

In at least some embodiments (not shown) a seal may be provided on the camera module 253 to seal the portion of the opening 406 between the top side and the lens barrel to prevent dust and debris from entering the camera module 253. That is, a seal may be provided between the portion of the top side which defines the opening and the lens barrel. The seal may be constructed of a flexible material such as rubber and may be located in the opening 406 between the non-open portion of the top side 460 (i.e. the portion of the top side 460 which defines the opening 406) and the lens barrel 402.

The camera module 253 includes an actuator 410 which engages the lens barrel 402 and which moves the lens barrel 402 relative to the image sensor 422. That is, the actuator 410 moves the lens barrel 402 between two extreme positions including a first position (which is illustrated in FIGS. 4 to 7) and a second position (which may be the position illustrated in FIG. 8 or the position illustrated in FIG. 9). When the lens barrel 402 is in the second position, the lens barrel 402 is nearer the image sensor than when the lens barrel 402 is in the first position.

Accordingly, the actuator 410 is configured to move the lens barrel 402 to a first position in which at least a portion of the lens barrel 402 extends through the opening 406 defined by the top side of the housing. The first position, which is illustrated in FIGS. 4 to 7, is one of the two extreme positions provided by the actuator 410. The first extreme position represents a position in which the lens barrel 402 is in its furthest position from the image sensor 422. When in the first position, the lens barrel 402 protrudes from the housing 405 of the camera module 253. That is, portions of the lens barrel 402 are on both sides of the opening top side 460 of the housing 405. In at least some embodiments, when in the first position, at least one of the lens elements 412a, 412b, 412c, 412d is located outside of the housing 405. More particularly, in the example embodiment illustrated, the uppermost lens element 412a is external to the housing 405.

In at least some embodiments, the actuator 410 may be processor controlled. More particularly, in at least some embodiments, the actuator 410 is communicably coupled to a controller, such as the processor 240 of FIG. 1 or another processor. For example, the processor 240 may be connected to the actuator 410 via the connection interface 420 of the camera module 253.

The processor 240 may be an image signal processor and may be configured to activate the actuator 410 to cause the actuator to move the lens barrel 402 relative to the image sensor 422 in order to focus the camera module 253 on a subject. Since the lens barrel is a component of the lens, movement of the lens barrel results in movement of the lens itself. That is, other components of the lens may be moved in addition to the lens barrel. For example, movement of the lens barrel 402 results in movement of the lens elements 412a, 412b, 412c, 412d.

The lens of a camera module 253, which includes the lens elements 412a, 412b, 412c, 412d recreates an optical image of a scene to capture in an optical image plane. In order to provide auto-focusing, the lens (which includes the lens elements) is moved relative to the image sensor 422 so that the optical image place matches the position of the sensor image plane.

Accordingly, in at least some embodiments, the processor 240 may be configured to drive the actuator 410 in order to focus the camera module 253.

The actuator 410 may, in at least some embodiments, be a voice coil motor based actuator. In at least some embodiments, the actuator 410 may include a movable portion 474 and a fixed portion 476. The movable portion 474 may be affixed to the lens barrel 402. In the example embodiment illustrated, the movable portion 474 is cylindrical and surrounds the lens barrel 402. The movable portion 474 may move relative to the image sensor 422 and to the fixed portion 476. The fixed portion 476 may be held in a fixed position with respect to the image sensor 422. That is, the fixed portion 476 may not move relative to the image sensor 422. The fixed portion may, however, be configured to cause the movable portion to move relative to the image sensor 422, also causing the lens barrel 402 to move relative to the image sensor 422. In the example illustrated, the fixed portion 476 is fixed within the housing 405 and the exterior of the fixed portion 476 (i.e. the portion which is near the housing 405) has a size and shape which corresponds to that of the housing 405. In this example case the exterior is a rectangular prism and the interior of the fixed portion 476 (i.e. the portion which is near the movable portion 474) has a size and shape corresponding to the size and shape of the exterior of the movable portion 474 (in this example case the interior is substantially cylindrical).

The movement of the movable portion 474 may be caused, for example, as a result of a magnetic field produced by the fixed portion 476. However, other types of actuators 410 may be used in other embodiments.

While FIG. 7 illustrates one possible position of the lens barrel 402, the actuator may also move the lens barrel 402 from the position of FIG. 7 to another position. Referring now to FIG. 8, the actuator 410 may be configured to move the lens barrel 402 from the first position, illustrated in FIG. 7, to a second position, which is illustrated in FIG. 8. The second position illustrated in FIG. 8 may, in at least some embodiments, represent a second extreme position. That is, the position of the lens barrel 402 in FIG. 8 may represent the closest position between the lens barrel 402 and the image sensor 422 that is provided by the actuator 410. The actuator 410 may move the lens barrel between two extreme positions—the first extreme position (such as the example position of FIG. 7) and the second extreme position (which may be the position of FIG. 8).

In FIG. 8, the lens barrel 402 is held by the actuator 410 in a position in which at least a portion of the lens barrel extends through the opening 406. In the embodiment of FIG. 8, a portion of the lens barrel protrudes from the housing 405 of the camera module 253. However, the portion which protrudes from the housing 405 in the second extreme position illustrated in FIG. 8 is not as large as the portion which protrudes from the housing in the first extreme position illustrated in FIG. 7. Accordingly, in at least some embodiments, the actuator 410 is configured to only move the lens barrel 402 between positions where the lens barrel extends through the opening 406. The degree to which the lens barrel 402 protrudes from the housing 405 may, however, vary.

Referring now to FIG. 9, in other embodiments, the actuator 410 may be configured to move the lens barrel from a first position in which a portion of the lens barrel protrudes from the housing 405 (an example of which is illustrated in FIG. 7), to a second position in which no portion of the lens barrel protrudes from the housing 405. The second position illustrated in FIG. 9 may, in at least some embodiments, represent a second extreme position. That is, the position of the lens barrel 402 in FIG. 9 may represent the closest position between the lens barrel 402 and the image sensor 422 that is provided by the actuator 410. The actuator 410 may move the lens barrel between two extreme positions—the first extreme position (such as the example position of FIG. 7) and the second extreme position (which may be the position of FIG. 9).

The second position illustrated in FIG. 9 is similar to the second position illustrated in FIG. 8 except that in FIG. 8 a portion of the lens barrel extends through the opening and protrudes from the housing while in FIG. 9, no portion of the lens barrel extends through the opening and protrudes from the housing.

FIGS. 4 to 9 illustrate an embodiment in which the lens barrel has substantially the same geometry along its length. That is, in the embodiments of FIGS. 4 to 9, the lens barrel is cylindrical and has approximately the same diameter along its complete length. However, in other embodiments (not illustrated), the perimeter or diameter of the lens barrel may not be common along the length of the lens barrel. For example, in at least some embodiments, the lens barrel may have a smaller perimeter or diameter at the light-receiving end 442 of the lens than at another part of the lens barrel. For example, the portion of the lens barrel which is near the light-receiving end 442 of the lens barrel may be smaller (e.g. have a smaller perimeter, diameter and/or cross section) than the portion of the lens barrel at the light providing end 440. That is, the portion of the lens barrel which is configured to extend through the opening 406 and/or protrude from the housing 405 of the camera module 253 may be smaller than other portions of the lens barrel which do not have to protrude or extend through the opening 406. In at least some embodiments, the opening 406 may be sufficiently large to permit the portion of the lens barrel which is at the light-receiving end 442 of the lens barrel to pass through the opening 406 but is not sufficiently large to permit another portion of the lens barrel (such as the portion of the lens barrel which is at the light-providing end 440) to pass.

In at least some embodiments, the lens barrel housing may be externally shaped to resemble two or more stacked cylinders. The cylinder(s) in the stack which are nearer the image sensor 422 may have a greater diameter than the cylinder(s) which are relatively further from the image sensor 422.

Also, in the embodiment of FIGS. 4 to 9, the lens elements 412a, 412b, 412c, 412d are each approximately the same size. That is, the lens elements are each circular and have a common diameter. However, in other embodiments, the lens elements 412a, 412b, 412c, 412d may be of different sizes. That is, the perimeter or diameter of the lens elements may vary. In at least some embodiments, an uppermost lens element 412a (which is the lens element that is furthest from the image sensor 422) may have a smaller diameter than a lowermost lens element 412d (which is the lens element that is closest to the image sensor 422).

Accordingly, the actuator 410 is configured to move a portion of the lens barrel through the opening 406 defined by the housing 405 of the camera module 253. In order to permit the lens barrel to move freely through the opening, the portion of the lens barrel which passes through the opening 406 defined by the housing 405 of the camera module 253 is designed to pass freely through the opening 406. For example, the portion of the lens barrel which is designed to move through the opening may, for example, have an exterior size and shape which corresponds to the size and shape of the opening. That is, the portion of the lens barrel which passes through the opening may have a similar size and be slightly smaller than the opening 406.

Figure 10:
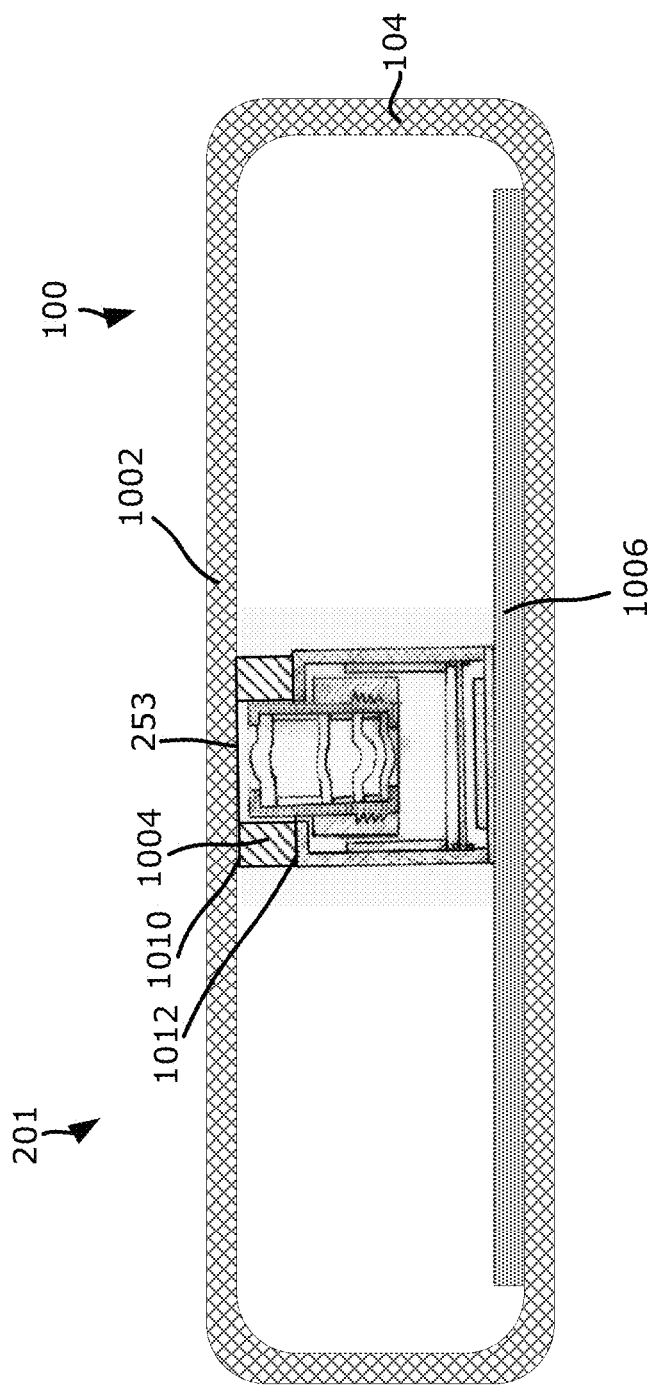
FIG. 10 is a cross sectional view of the electronic device of FIG. 2 taken along line 10-10 of FIG. 2.

Referring now to FIG. 10, an example embodiment of electronic device 201 is illustrated in cross section. The electronic device 201 includes the camera module 253 of FIGS. 4 to 9. The cross section is taken along the line 10-10 of FIG. 2. In the example embodiment illustrated, the electronic device is a smartphone 100. However, the electronic device 201 could be another type of device in other embodiments.

For the purposes of illustration, the reference numerals identifying features of the camera module 253 have been removed from the illustration of FIG. 10.

In FIG. 10, the camera module 253 is in the first position, which is described above with reference to FIG. 7. In the first position, a lens barrel 402 of the camera module 253 protrudes from the housing 405 of the camera module 253. The lens barrel 402 may also be moved by the actuator 410 to a second position, such as the second position described with reference to FIG. 8 or FIG. 9.

In the embodiment of FIG. 10, the electronic device 201 includes a gasket 1004 which is located on a gasket seat of the camera module 253 (i.e. the top side 460 of FIGS. 7, 8, 9). The gasket seat is provided on the exterior of the housing 405 of the camera module 253. The gasket 1004 may be an annular gasket which defines a gasket opening. When the camera module 253 is in the first position (e.g. the position described with reference to FIG. 7), a portion of the lens barrel 402 of the camera module 253 extends within the gasket opening.

The gasket 1004 may include a camera module side 1012, which is located nearest the gasket seat (i.e. the top side 460 of FIGS. 7, 8, 9) and an exterior side 1010 which is located away from the gasket seat.

The gasket 1004 may be sized so that the lens barrel 402 does not protrude through the gasket. That is, in either extreme position provided by the camera module 253, the lens barrel does not extend fully through the gasket opening to protrude from the gasket 1004. The lens barrel may extend within the opening, but may not extend fully through the opening to protrude from the gasket.

The amount by which the lens barrel 402 protrudes from the housing 405 may be less than the height of the gasket 1004.

The electronic device 201 may also include a cover 1002 disposed on the exterior side 1010 of the gasket 1004 to cover the gasket opening. The cover 1002 is, in at least some embodiments, provided by a housing 104 of the electronic device 201. The cover 1002 may compress the gasket 1004 against the camera module 253. The cover 1002 and the gasket 1004 may seal the lens barrel 402 from dust and debris. In at least some embodiments, the gasket 1004 is constructed of a compressible material, such as rubber.

The cover 1002 may, in at least some embodiments, be constructed of plastic. To permit light to enter the camera module 253, at least a portion of the cover 1002 which covers the gasket opening may be clear.

The camera module 253 may be mounted on or connected to a PCB 1006 of the electronic device 201. The electronic device 201 may include other components which are not specifically illustrated in FIG. 10 and, in practice, the area to the left and right of the camera module 253 will include some such components.

The various example embodiments presented above are merely examples and are in no way meant to limit the scope of this disclosure. Variations of the innovations described herein will be apparent to persons of ordinary skill in the art, such variations being within the intended scope of the present application. In particular, features from one or more of the above-described example embodiments may be selected to create alternative embodiments included of a sub-combination of features which may not be explicitly described above. In addition, features from one or more of the above-described example embodiments may be selected and combined to create alternative embodiments included of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. An electronic device comprising:
   a camera module, the camera module comprising:
      a housing for housing components of the camera module, the housing having a top side which defines an opening, the top side having an external surface that is a gasket seat for receiving a gasket;
      a lens barrel housed by the housing and having one or more lens elements;
      an actuator housed by the housing and engaging the lens barrel, the actuator being configured to move the lens barrel to a first position in which at least a portion of the lens barrel extends through the opening; and
      an image sensor for receiving light which passes through the lens elements of the lens barrel, the image sensor being configured to produce an electronic signal based on the received light; and
   a processor electrically connected to the camera module for receiving the electronic signal from the image sensor.

2. The electronic device of claim 1, wherein the actuator is further configured to move the lens barrel to a second position in which the lens barrel does not extend through the opening.

3. The electronic device of claim 2, wherein the first position is a first extreme position provided by the actuator and wherein the actuator is further configured to move the lens barrel to a second extreme position and wherein at least a portion of the lens barrel extends through the opening when the lens barrel is in the second extreme position.

4. The electronic device of claim 3 wherein, when the lens barrel is in the first position, the lens barrel protrudes from the housing.

5. The electronic device of claim 1, wherein the actuator is configured to move a portion of the lens barrel through the opening and wherein the portion of the lens barrel which may be moved through the opening by the actuator has an exterior shape which corresponds to the shape of the opening.

6. The electronic device of claim 1, further comprising a seal between the portion of the top side which defines the opening and the lens barrel.

7. The electronic device of claim 1, further comprising:
   a gasket located on the gasket seat, the gasket comprising a camera module side which is located nearest the gasket seat and an exterior side which is located away from the gasket seat.

8. The electronic device of claim 7, wherein the gasket is an annular gasket.

9. The electronic device of claim 1, wherein the gasket defines a gasket opening and wherein a portion of the lens barrel extends within the gasket opening when the lens barrel is in the first position.

10. The electronic device of claim 9, wherein the first position is a first extreme position provided by the actuator and wherein the actuator is further configured to move the lens barrel to second extreme position and wherein the lens barrel does not extend fully through the gasket opening to protrude from the gasket in the first extreme position or the second extreme position.

11. The electronic device of claim 1, further comprising:
   a cover disposed on the exterior side of the gasket to cover the gasket opening, at least a portion of the cover which covers the gasket opening being clear to permit light to enter the gasket opening.

12. The electronic device of claim 11, where the cover compresses the gasket.

13. A camera module comprising:
   a housing for housing components of the camera module, the housing having a top side which defines an opening, the top side having an external surface that is a gasket seat for receiving a gasket;
   a lens barrel housed by the housing and having one or more lens elements;
   an actuator housed by the housing and engaging the lens barrel, the actuator being configured to move the lens barrel to a first position in which at least a portion of the lens barrel extends through the opening; and an image sensor for receiving light which passes through the lens elements of the lens barrel, the image sensor being configured to produce an electronic signal based on the received light.

14. The camera module of claim 13, wherein the actuator is further configured to move the lens barrel to a second position in which the lens barrel does not extend through the opening.

15. The camera module of claim 13, wherein the first position is a first extreme position provided by the actuator and wherein the actuator is further configured to move the lens barrel to a second extreme position and wherein at least a portion of the lens barrel extends through the opening when the lens barrel is in the second extreme position.

16. The camera module of claim 15 wherein, when the lens barrel is in the first position, the lens barrel protrudes from the housing.

17. The camera module of claim 13, wherein the actuator is configured to move a portion of the lens barrel through the opening and wherein the portion of the lens barrel which may be moved through the opening by the actuator has an exterior shape which corresponds to the shape of the opening.

18. The camera module of claim 13, further comprising a seal between the portion of the top side which defines the opening and the lens barrel.

* * * * *